(12) United States Patent
Inoue et al.

(10) Patent No.: US 11,183,919 B2
(45) Date of Patent: Nov. 23, 2021

(54) POWER SUPPLY CONTROL DEVICE AND SWITCHING POWER SUPPLY

(71) Applicant: SEIKO EPSON CORPORATION, Tokyo (JP)

(72) Inventors: Katsumi Inoue, Matsumoto (JP); Kanji Aoki, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/825,136

(22) Filed: Mar. 20, 2020

(65) Prior Publication Data

US 2020/0304031 A1 Sep. 24, 2020

(30) Foreign Application Priority Data

Mar. 22, 2019 (JP) .............................. JP2019-054158

(51) Int. Cl.
*H02M 1/36* (2007.01)
*H02M 1/00* (2006.01)
*H02M 3/335* (2006.01)

(52) U.S. Cl.
CPC ........... *H02M 1/36* (2013.01); *H02M 1/0006* (2021.05); *H02M 3/33523* (2013.01)

(58) Field of Classification Search
CPC .... H02M 1/0006; H02M 1/36; H02M 1/0048; H02M 3/335–33592
See application file for complete search history.

(56) References Cited

U.S. PATENT DOCUMENTS

| | | | | |
|---|---|---|---|---|
| 9,837,917 | B1* | 12/2017 | Furtner | ............ H02M 3/33523 |
| 10,819,219 | B2* | 10/2020 | Matsuda | ................. H02M 1/36 |
| 2015/0023070 | A1* | 1/2015 | Nate | ................. H02M 3/33507 363/21.17 |
| 2018/0019656 | A1* | 1/2018 | Matsuda | ........... H02M 3/33523 |
| 2019/0074761 | A1* | 3/2019 | Matsuda | ................. H02M 1/08 |
| 2020/0303941 | A1* | 9/2020 | Inoue | .................... H02M 3/137 |

FOREIGN PATENT DOCUMENTS

JP 2011-244602 A 12/2011

* cited by examiner

*Primary Examiner* — Fred E Finch, III
(74) *Attorney, Agent, or Firm* — Rankin, Hill & Clark LLP

(57) ABSTRACT

A power supply control device includes a charge circuit charging a capacitor coupled to a second node with a full-wave rectified voltage input into a first node when activated, a first detection circuit detecting if the first node is less than a first voltage, a second detection circuit detecting if the second node is less than a second voltage and if the second node is equal to or higher than a third voltage higher than the second voltage, a discharge circuit discharging an electric charge accumulated in the first node by activation, and a control circuit activating the charge circuit when the voltage of the first node is less than the first voltage, activates the discharge circuit when the second node is less than the second voltage, and deactivates the discharge circuit when the voltage of the second node is equal to or higher than the third voltage.

6 Claims, 6 Drawing Sheets

POWER SUPPLY CONTROL DEVICE AND SWITCHING POWER SUPPLY

The present application is based on, and claims priority from JP Application Serial Number 2019-054158, filed Mar. 22, 2019, the disclosure of which is hereby incorporated by reference herein in its entirety.

BACKGROUND

1. Technical Field

The present disclosure relates to a power supply control device and a switching power supply, for example.

2. Related Art

In the related art, a switching power supply that generates an output voltage by supplying a DC voltage obtained by rectifying an AC voltage from an AC power supply to a primary winding of a transformer by turning it on/off using a switching element and rectifying and smoothing a voltage induced in a secondary winding of the transformer is known. Here, the on/off of the switching element is generally controlled by a power supply control device integrated in a semiconductor.

As a power supply of such a power supply control device, a voltage induced in the auxiliary winding of the transformer by turning on/off the switching element is used. Specifically, a voltage obtained by rectifying the voltage induced in the auxiliary winding and charged into the capacitor is used as the power supply of the power supply control device.

Here, a technology is known in which when the charge voltage of the capacitor is insufficient for some reason, a start-up circuit provided in the power supply control device is turned on to charge the capacitor with a full-wave rectified voltage of the AC voltage from the AC power supply (for example, JP-A-2011-244602).

In the technology, when the start-up circuit is turned on with the full-wave rectified voltage being high, the loss increases. Therefore, the start-up circuit is turned on when the voltage of the node to which the full-wave rectified voltage is input is less than the threshold value.

However, in the technology, when the start-up circuit is turned off, there is a case where the load on the node to which the full-wave rectified voltage is input becomes lighter, the follow-up property of the node is deteriorated at the fall of the full-wave rectification due to the parasitic capacitance of the node, and the voltage of the node does not fall below the threshold value. In this case, since it is difficult to charge the capacitor, there is a problem in that the power supply control device using the charge voltage as a power supply may become inoperable.

SUMMARY

A power supply control device according to an aspect of the present disclosure includes a start-up circuit that charges a capacitor coupled to a second node with a full-wave rectified voltage input into a first node by being turned on, a first detection circuit that detects whether or not a voltage of the first node is less than a first voltage, a second detection circuit that detects whether or not a voltage of the second node is decreased to be less than a second voltage and whether or not the voltage of the second node is increased to be equal to or higher than a third voltage higher than the second voltage, a discharge circuit that discharges an electric charge accumulated in the first node by being turned on, and a control circuit that, in a period from when the second detection circuit detects that the voltage of the second node is decreased to be less than the second voltage until the second detection circuit detects that the voltage of the second node is increased to reach the third voltage, turns on the start-up circuit and turns on the discharge circuit over a portion or entirety of the period when the first detection circuit detects that the voltage of the first node is less than the first voltage.

DESCRIPTION OF EXEMPLARY EMBODIMENTS

Hereinafter, a drive control device according to an embodiment will be described with reference to the drawings. In each drawing, the size and scale of each portion are appropriately different from the actual ones. Since the embodiments described below are preferable specific examples of the present disclosure, various technically preferable limitations are attached. However, the scope of the present disclosure is not limited to these forms unless otherwise specified in the following description.

Figure 1:
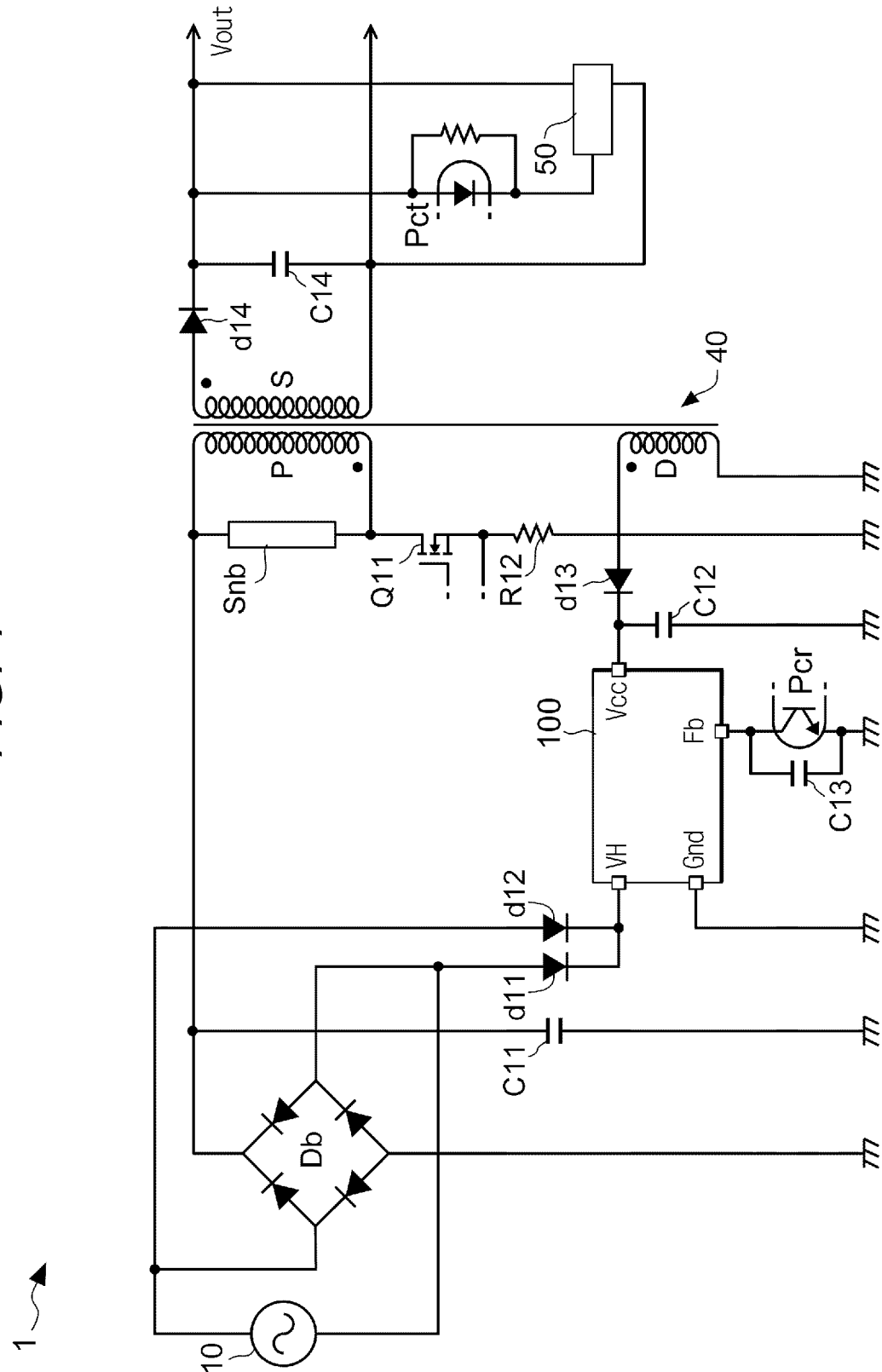
FIG. 1 is a diagram showing a switching power supply including a power supply control device according to a first embodiment.

FIG. 1 is a diagram showing a switching power supply 1 including a power supply control device 100 according to a first embodiment. As shown in FIG. 1, the switching power supply 1 is a so-called flyback system. Specifically, the switching power supply 1 stores energy by causing a current to flow through a primary winding P of a transformer 40 when a transistor Q11 is turned on, outputs the stored energy from a secondary winding S of the transformer 40 via a diode d14 by turning off the transistor Q11, and smooths it by a capacitor C14 to generate a DC voltage Vout.

A diode bridge Db, which is an example of a first rectifier circuit, rectifies the AC voltage from an AC power supply 10. The positive terminal of the diode bridge Db is coupled to one end of the primary winding P in the transformer 40 and one end of a capacitor C11, and the negative terminal of the diode bridge Db and the other end of the capacitor C11 are grounded to a node Gnd having a voltage of zero.

In addition to the primary winding P, the transformer 40 includes a secondary winding S and an auxiliary winding D, and the other end of the primary winding P is coupled to the drain node of the transistor Q11. The transistor Q11, which is an example of a switching element, is an N-channel MOSFET, for example, and has a source node coupled to one end of a resistance element R12. The other end of the resistance element R12 is grounded to the node Gnd. For this reason, the primary winding P and the transistor Q11 are provided in series between the positive terminal and the negative terminal in the diode bridge Db.

A snubber circuit Snb is provided between one end and the other end of the primary winding P in the transformer 40, and absorbs a transient voltage generated in the primary winding P by turning on/off the transistor Q11.

One end of the secondary winding S is coupled to the anode of the diode d14. The capacitor C14 is coupled between the cathode of the diode d14 and the other end of the secondary winding S, and the voltage smoothed by the capacitor C14 is output as Vout. For this reason, the diode d14 and the capacitor C14 function as an example of a first output circuit that rectifies and smooths the voltage induced in the secondary winding S.

The anode of a light emitting diode Pct in a photocoupler is coupled to the cathode of the diode d14, and the cathode of the light emitting diode Pct is coupled to an error amplifier 50.

The error amplifier 50 causes a current corresponding to the deviation between the voltage Vout and the internal reference voltage to flow through the light emitting diode Pct.

One end of the auxiliary winding D in the transformer 40 is coupled to the anode of the diode d13, and the cathode of the diode d13 is coupled to a node Vcc serving as the power supply terminal of the power supply control device 100 and one end of a capacitor C12. The other end of the auxiliary winding D and the other end of the capacitor C12 are grounded to the node Gnd.

The voltage induced in the auxiliary winding D of the transformer 40 is rectified by the diode d13, smoothed by the capacitor C12 and charged therein, and supplied to the node Vcc as the power supply voltage of the power supply control device 100. For this reason, the diode d13 and the capacitor C12 function as an example of a second output circuit that rectifies and smooths the voltage induced in the auxiliary winding D.

The node Vcc is an example of a second node. Not only the voltage from the induced voltage of the auxiliary winding D rectified by the diode d13, but also the voltage supplied via a node VH described later may be charged in the capacitor C12.

The emitter of a phototransistor Pcr of the photocoupler is grounded to the node Gnd, and the collector is coupled to a node Fb in the power supply control device 100. The capacitor C13 is coupled in parallel with the phototransistor Pcr.

The power supply control device 100 is integrated in, for example, a semiconductor, and a voltage due to the current flowing in the phototransistor Pcr is generated at the node Fb pulled up by the resistor from the internal power supply voltage. Therefore, a voltage corresponding to the deviation of the voltage Vout is generated at the node Fb. Although not particularly shown, the power supply control device 100 detects the voltage of the node Fb and controls on/off of the transistor Q11 in a direction in which the deviation indicated by the voltage becomes zero. Specifically, the power supply control device 100 generates a PWM signal in a direction in which the deviation becomes zero and supplies the PWM signal to the gate node of the transistor Q11.

In FIG. 1, the transistor Q11 is separate from the power supply control device 100, but may be integrated in the power supply control device 100.

The AC voltage from the AC power supply 10 is full-wave rectified by the diodes d11 and d12 and applied to the node VH in the power supply control device 100. Therefore, the diodes d11 and d12 are an example of the second rectifier circuit.

When the AC power supply 10 is just coupled or immediately after the power is turned on, a sufficient voltage is not charged in the capacitor C12. If for some reason the transistor Q11 does not turn on/off, no voltage is induced in the auxiliary winding D, so the voltage charged in the capacitor C12 decreases and the charge voltage becomes insufficient. In preparation for such a case, the power supply control device 100 also performs control to charge the capacitor C12 using the voltage applied to the node VH.

Figure 2:
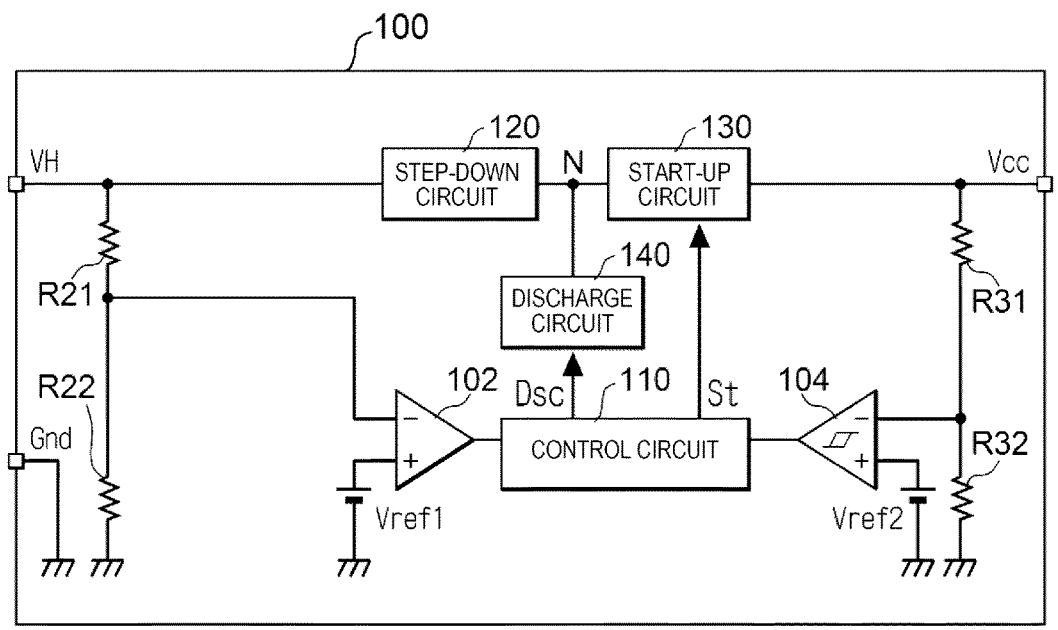
FIG. 2 is a diagram showing the power supply control device according to the first embodiment.

FIG. 2 is a diagram showing an example of such a power supply control device 100. As shown in FIG. 2, the power supply control device 100 includes resistance elements R21, R22, R31, and R32, comparators 102 and 104, a control circuit 110, a step-down circuit 120, a start-up circuit 130, and a discharge circuit 140.

The step-down circuit 120 steps down the voltage of the node VH and applies it to the node N. Node VH is an example of a first node. When the start-up circuit 130 is turned on, a constant current flows from the node N to the node Vcc to charge the capacitor C12. The discharge circuit 140 discharges the electric charge accumulated in the capacitance parasitic to the node VH via the node N when turned on.

Figure 3:
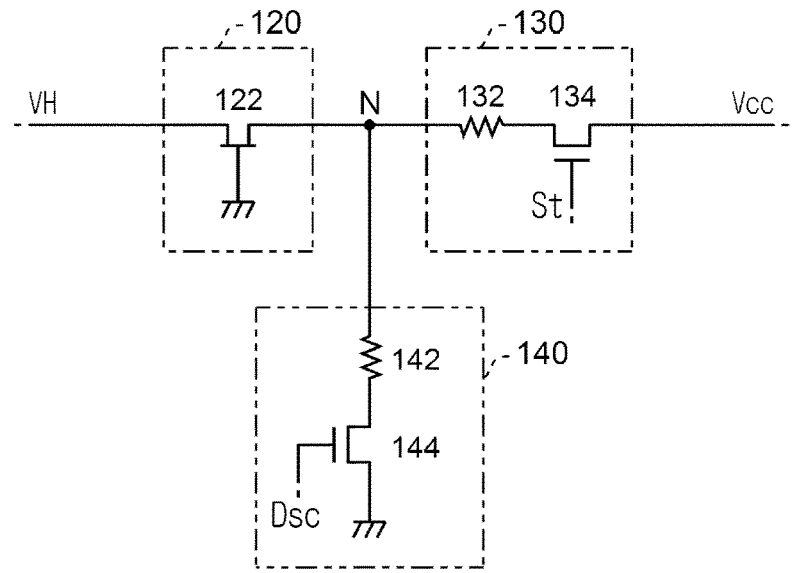
FIG. 3 is a diagram showing a step-down circuit and the like in the power supply control device.

FIG. 3 is a diagram showing an example of the configuration of the step-down circuit 120, the start-up circuit 130, and the discharge circuit 140.

In FIG. 3, the step-down circuit 120 is constituted by, for example, a JFET transistor 122. The step-down circuit 120 steps down the voltage of the node VH by the pinch-off component of the transistor 122 and applies it to the node N.

The start-up circuit 130 includes, for example, a resistance element 132 and a transistor 134 coupled in series between the node N and the node Vcc. A signal St output from the control circuit 110 is supplied to the gate node of the transistor 134, and on/off of charging of the capacitor C12 via the node Vcc is controlled by the signal St. When the start-up circuit 130 is turned on, the voltage applied to the node VH is applied to the node Vcc through the step-down by the step-down circuit 120.

The discharge circuit 140 includes, for example, a resistance element 142 and a transistor 144 coupled in series between the node N and the node Gnd. A signal Dsc output from the control circuit 110 is supplied to the gate node of the transistor 144, and on/off is controlled by the signal Dsc. When the transistor 144 is turned on, the electric charge accumulated in the capacitance parasitic to the node VH is discharged to the node Gnd through the transistor 122 and the resistance element 142.

Returning to FIG. 2 again, the resistance elements R21 and R22 divide the voltage of the node VH and apply it to the negative input terminal (−) of the comparator 102. A voltage Vref1 is applied to the positive input terminal (+) of the comparator 102.

The comparator 102 outputs an H level signal when the voltage at the negative input terminal (−) is less than the voltage Vref1 applied to the positive input terminal (+), and outputs an L level signal otherwise. Here, the voltage Vref1 corresponds to a voltage obtained by dividing the voltage of the node VH by the resistance elements R21 and R22 when the voltage of the node VH is the threshold value Vth_ac. Therefore, the comparator 102 is an example of a first detection circuit that detects whether or not the voltage of the node VH is less than the threshold value Vth_ac. The threshold value Vth_ac is an example of the first voltage.

The resistance elements R31 and R32 divide the voltage of the node Vcc and apply it to the negative input terminal (−) of a comparator 104. The voltage Vref2 is applied to the positive input terminal (+) of the comparator 104.

The comparator 104 is a hysteresis comparator, and the threshold value applied when the voltage at the negative input terminal (−) is decreasing is different from the threshold value applied when it is increasing. Specifically, when the voltage at the negative input terminal (−) is decreasing, the comparator 104 outputs an H level signal when the voltage at the negative input terminal (−) becomes less than the voltage (Vref2−α) obtained by shifting the voltage Vref2 applied to the positive input terminal (+) to the lower side by α. When the voltage at the negative input terminal (−) is increasing, the comparator 104 outputs an L level signal when the voltage at the negative input terminal (−) becomes equal to or higher than the voltage (Vref2+α) obtained by shifting the voltage Vref2 applied to the positive input terminal (+) to the higher side by α.

Here, the voltage (Vref2−α) corresponds to a voltage obtained by dividing the voltage of the node Vcc by the resistance elements R31 and R32 when the voltage of the node Vcc is the threshold value Vdet_L. Similarly, the voltage (Vref2+α) corresponds to a voltage obtained by dividing the voltage of the node Vcc by the resistance elements R31 and R32 when the voltage of the node Vcc is the threshold value Vdet_U.

The threshold values Vdet_L and Vdet_U have the following relationship.

Vdet_L<Vdet_U

Here, the threshold value Vdet_L is an example of the second voltage, and the threshold value Vdet_U is an example of the third voltage.

The comparator 104 is an example of a second detection circuit that detects whether or not the voltage of the node Vcc decreases and the voltage becomes less than the threshold value Vdet_L and detects whether or not the voltage of the node Vcc increases and the voltage becomes equal to or higher than the threshold value Vdet_U.

The control circuit 110 controls the start-up circuit 130 and the discharge circuit 140 based on the detection results by the comparators 102 and 104. Although details will be described later, the control circuit 110 turns on the discharge circuit 140 during a period in which the voltage of the node Vcc decreases to the threshold value Vdet_L and then increases to the threshold value Vdet_U, and turns on the start-up circuit 130 when the voltage of the node VH is less than the threshold value Vth_ac in the same period.

Here, the process of adopting the configuration shown in FIG. 2 in the present embodiment will be described.

Figure 4:
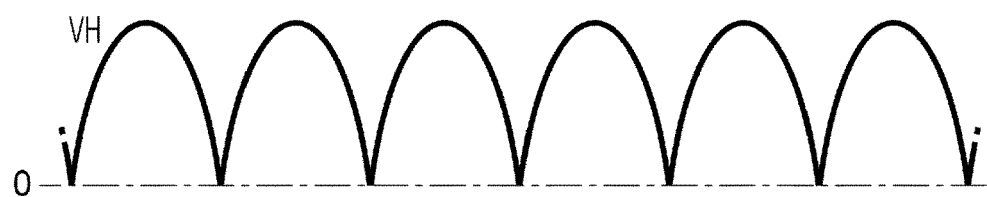
FIG. 4 is a diagram showing the voltage waveform of a node VH input to the power supply control device.

When the voltage of the node Vcc is insufficient, the control circuit 110 charges the capacitor C12 using the voltage of the node VH. Specifically, when the node Vcc voltage is insufficient, the control circuit 110 turns on the start-up circuit 130 when the control circuit 110 detects the input of the voltage waveform applied to the node VH, specifically full-wave rectified voltage waveform as shown in FIG. 4. As a result, the voltage applied to the node VH is stepped down by the step-down circuit 120 and charged in the capacitor C12, so that the voltage of the node Vcc increases. When the control circuit 110 detects that the voltage of the node Vcc has reached, for example, the threshold value Vdet_U, the control circuit 110 turns off the start-up circuit 130 and starts turning on/off the transistor Q11. By this switching, a voltage is induced in the auxiliary winding D, and the induced voltage is rectified by the diode d13 and charged in the capacitor C12.

If an abnormal state or the like is detected while the transistor Q11 is being switched, the control circuit 110 stops turning on/off the transistor Q11. When the on/off of the transistor Q11 is stopped, no voltage is induced in the auxiliary winding D, so that the charge voltage of the capacitor C12, that is, the voltage of the node Vcc decreases.

Even if the on/off of the transistor Q11 is stopped due to an abnormal state or the like, it is necessary to control the voltage of the node Vcc so as to be within a predetermined range, specifically, a voltage range that can be controlled by the IC.

Figure 12:
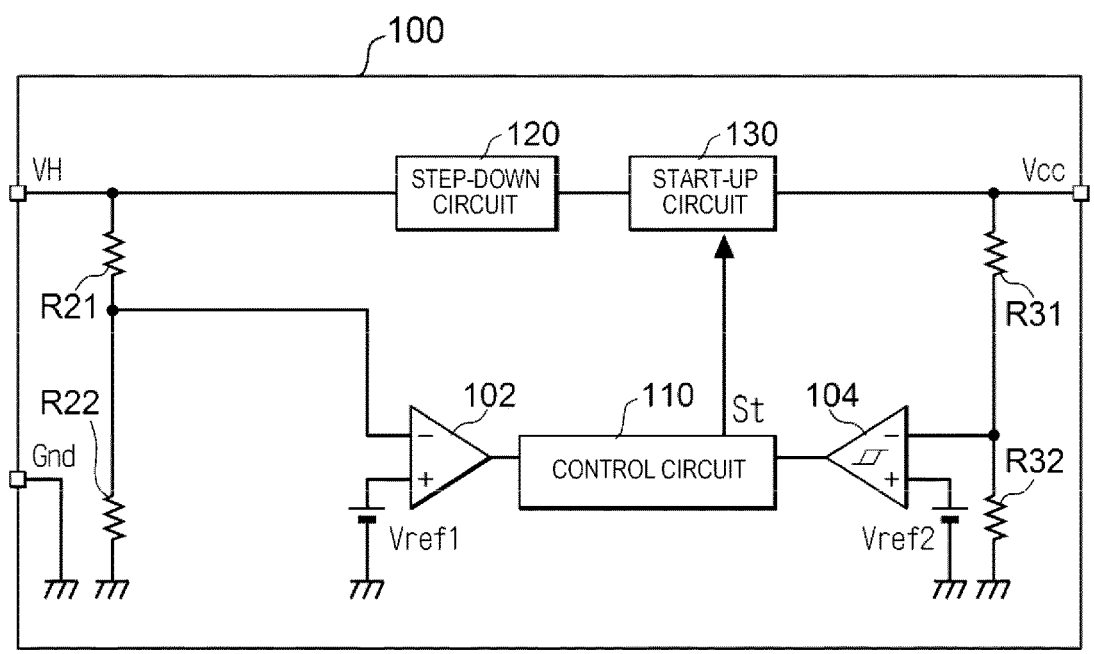
FIG. 12 is a diagram showing a power supply control device according to a comparative example.

Therefore, in the comparative example with respect to the present embodiment, it has been considered to execute the following control. FIG. 12 is a diagram showing a power supply control device according to a comparative example, and does not have the discharge circuit 140 as compared with the configuration of the present embodiment of FIG. 2. Further, since the control circuit 110 does not have the discharge circuit 140, the control content is also different from that of FIG. 2.

In the comparative example, when the voltage of the node Vcc decreases and becomes less than the threshold value Vdet_L, the control circuit 110 turns on the start-up circuit 130.

As a result, the voltage applied to the node VH is stepped down by the step-down circuit 120, applied to the node Vcc via the turned on start-up circuit 130, and charged in the capacitor C12, so that the voltage of the node Vcc increases. When the voltage of the node Vcc becomes equal to or higher than the threshold value Vdet_U, the control circuit 110 turns off the start-up circuit 130. Thereby, even when the on/off of the transistor Q11 is stopped, the voltage of the node Vcc is controlled so as to be within the range of the threshold value Vdet_L or higher and less than the threshold value Vdet_U.

However, in such control, since the loss due to the step-down circuit 120, particularly the loss when the voltage of the node VH is relatively high, is large, it is considered that the following control is executed. Specifically, as shown in FIG. 5, the control circuit 110 turns on the start-up circuit 130 when the node VH is less than the threshold Vth_ac during a period in which the voltage of the node Vcc falls below the threshold value Vdet_L and is less than the threshold value Vdet_U.

Figure 5:
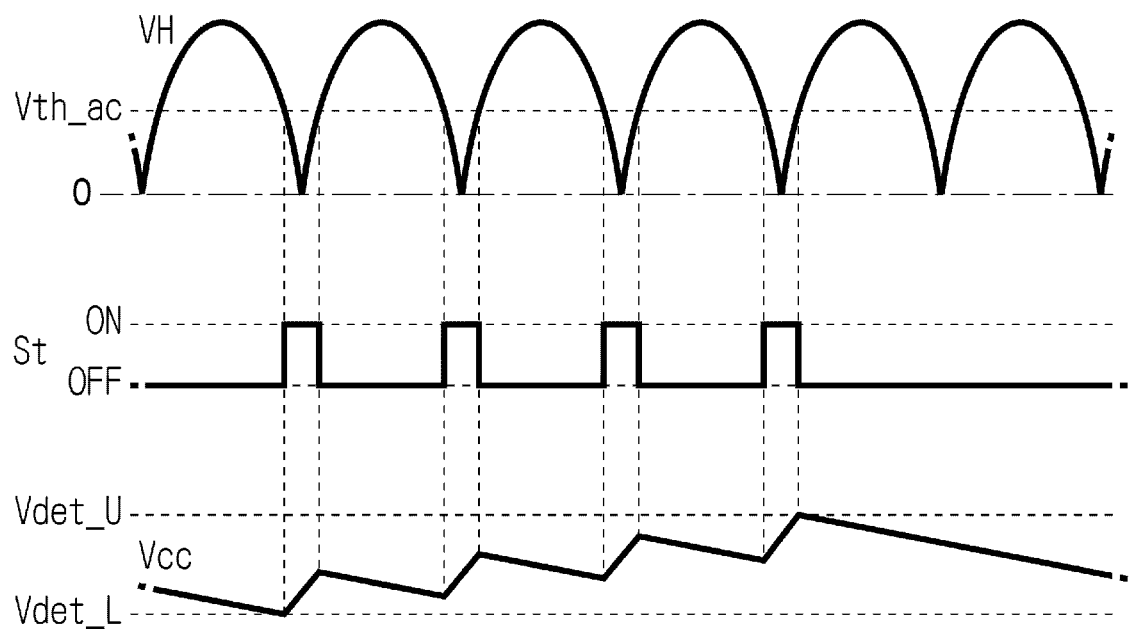
FIG. 5 is a diagram showing a charging operation with respect to voltages of nodes VH and Vcc.

In FIG. 5, the signal St does not indicate a logic level, but indicates an on/off state of the start-up circuit 130 based on the signal St.

It is considered that the power consumption can be reduced because the loss in the step-down circuit 120 is reduced by turning on the start-up circuit 130 as described above.

Figure 6:
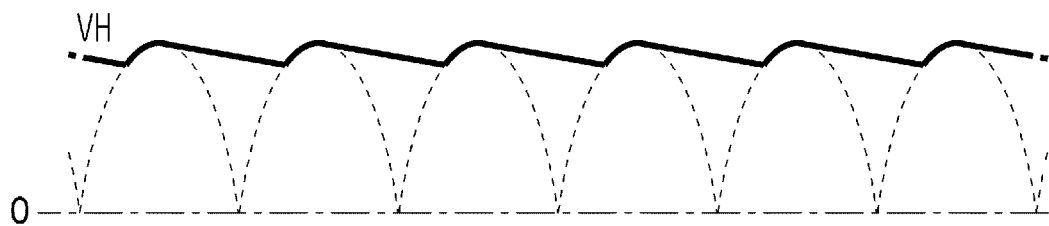
FIG. 6 is a diagram showing the voltage waveform of the node VH.

However, such control assumes that the voltage waveform at the node VH is an ideal full-wave rectified waveform. When the start-up circuit 130 is actually turned off, the load on the node Vcc side is reduced as viewed from the node VH, so that a capacitance component parasitic to the node VH becomes apparent. As shown in FIG. 6, due to the capacitance component when the start-up circuit 130 is turned off, the follow-up property at the fall of full-wave rectification deteriorates in the voltage waveform of the node VH.

Figure 7:
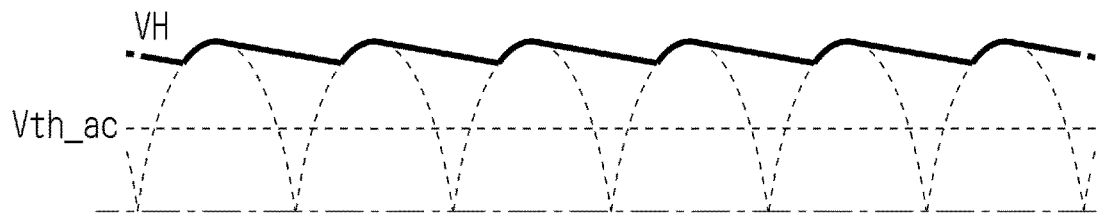
FIG. 7 is a diagram showing a charging operation with respect to the voltage of the node VH.

When the follow-up property of the node VH is deteriorated due to the capacitance component, the voltage of the node VH may not become less than the threshold value Vth_ac as shown in FIG. 7. In this case, since the control circuit 110 cannot turn on the start-up circuit 130, there is a possibility that the voltage of the node Vcc continues to decrease, the power supply control device 100 becomes inoperable, and the switching power supply 1 becomes a system error.

Therefore, in the present embodiment, a discharge circuit 140 is provided, and a function for controlling the discharge circuit 140 is added to the control circuit 110. Specifically, as shown in FIG. 8, the control circuit 110 turns on the discharge circuit 140 when the voltage of the node Vcc is in the range of the threshold value Vdet_L or higher and less than the threshold value Vdet_U.

Figure 8:
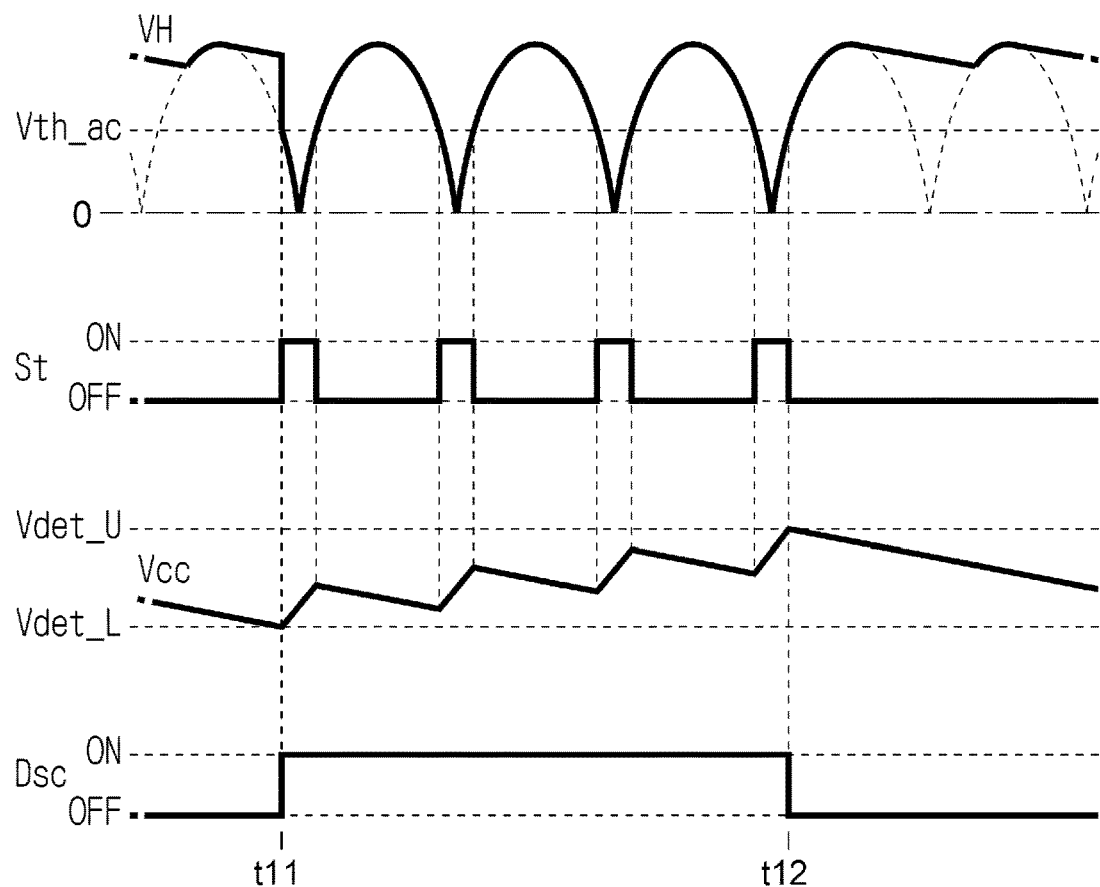
FIG. 8 is a diagram showing a charging operation and a discharging operation with respect to voltages of nodes VH and Vcc.

In FIG. 8, the signal Dsc does not indicate the logic level, but indicates the on/off state of the discharge circuit 140 based on the signal Dsc.

When the discharge circuit 140 is turned on, the electric charge accumulated in the capacitance component parasitic to the node VH is discharged, so that the follow-up property at the fall of full-wave rectification is improved in the voltage waveform of the node VH, which is in a good state. In this state, the control circuit 110 turns on the start-up circuit 130 when the voltage of the node VH is less than the threshold value Vth_ac.

FIG. 8 shows the following. Specifically, first, the voltage of the node Vcc decreases, reaches the threshold value Vdet_L at time t11, and the discharge circuit 140 is turned on. Second, when the discharge circuit 140 is turned on, the follow-up property at the fall of the full-wave rectification is good in the voltage waveform of the node VH. Third, in this state, the start-up circuit 130 is turned on when the voltage of the node VH is less than the threshold value Vth_ac. Fourth, the voltage of the node Vcc increase due to repeated turning on of the start-up circuit 130, reaches the threshold value Vdet_U at time t12, and the discharge circuit 140 is turned off.

With the power supply control device 100 according to the first embodiment, after the voltage of the node Vcc falls below the threshold value Vdet_L, the start-up circuit 130 is turned on when the node VH is less than the threshold value Vth_ac in the range below the threshold value Vdet_U. Therefore, it is possible to reduce power consumption as a portion of loss that occurs when applying the voltage of the node VH is suppressed.

According to the embodiment, when the capacitance component parasitic to the node VH becomes apparent, the discharge circuit 140 is turned on to reduce the influence of the capacitance component. Therefore, after the voltage of the node Vcc falls below the threshold value Vdet_L, it can be controlled more reliably within the range below the threshold value Vdet_U.

Since the on-state of the discharge circuit 140 is a discharge of the electric charge accumulated in the capacitance component, it is a kind of loss. Therefore, the configuration in which the discharge circuit 140 is turned on over the entire period in which the voltage of the node Vcc falls below the threshold value Vdet_U after the voltage Vcc falls below the threshold value Vdet_L can be said to have room for improvement in terms of reducing power consumption.

A second embodiment in which this point is improved will be described.

Figure 9:
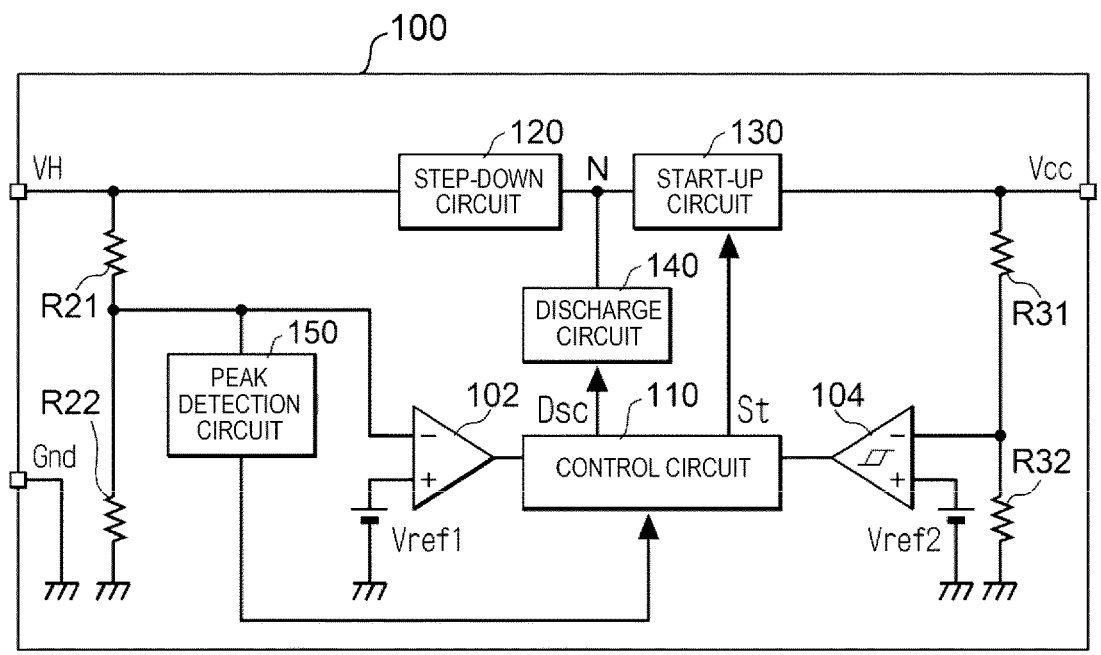
FIG. 9 is a diagram showing a power supply control device according to a second embodiment.

FIG. 9 is a diagram showing an example of a power supply control device 100 according to the second embodiment. In the second embodiment shown in FIG. 9, a peak detection circuit 150 is provided, and a function of controlling the discharge circuit 140 based on the detection result of the peak detection circuit 150 is added to the control circuit 110 in contrast to the first embodiment shown in FIG. 2.

The peak detection circuit 150 detects the peak of the voltage waveform obtained by dividing the node VH, and notifies the control circuit 110 of the timing of the detected peak.

The control circuit 110 intermittently turns on the discharge circuit 140 after the timing of the peak detected by the peak detection circuit 150 when the voltage of the node Vcc is less than the threshold value Vdet_U after the node Vcc falls below threshold value Vdet_L.

The control circuit 110 is the same as the first embodiment in that the start-up circuit 130 is turned on when the voltage of the node VH is less than the threshold value Vth_ac. Here, when the start-up circuit 130 is turned on, the load on the node VH increases, so that the follow-up property at the fall of full-wave rectification is good in the voltage waveform of the node VH, and the necessity of turning on the discharge circuit 140 is poor. Therefore, in the present embodiment, the control circuit 110 executes the intermittent turn-on of the discharge circuit 140 during a period from when the voltage peak at the node VH is detected until the voltage becomes less than the threshold value Vth_ac and the start-up circuit 130 is turned on.

However, when the voltage of the node Vcc decreases and reaches the threshold value Vdet_L, it is necessary to detect the voltage of the node VH in a state in which the follow-up property at the fall of the full-wave rectification is good. Therefore, when the voltage of the node Vcc reaches the threshold value Vdet_L, the control circuit 110 turns on the discharge circuit 140 regardless of the voltage of the node VH exceptionally, and when the voltage of the node VH is less than the threshold value Vth_ac and the start-up circuit 130 is turned on, the control circuit 110 does not intermittently turn on the discharge circuit 140.

Figure 10:
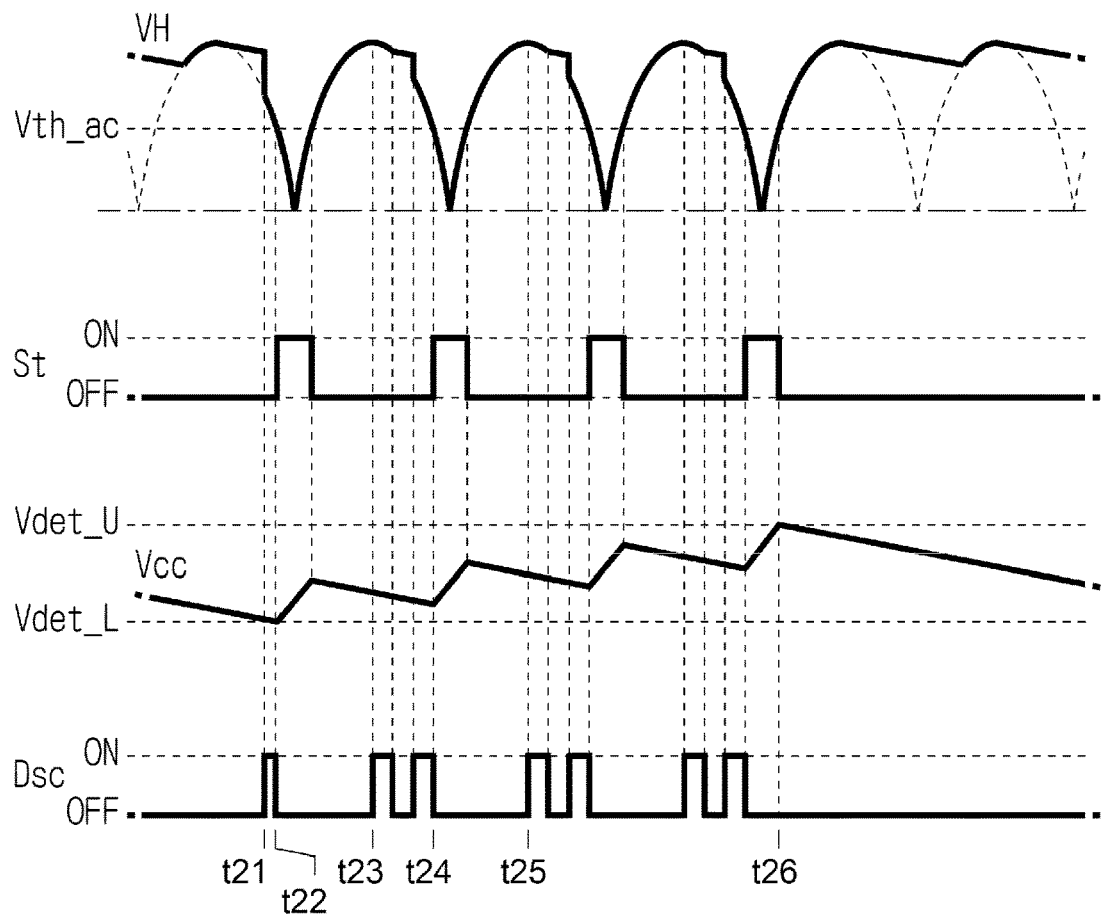
FIG. 10 is a diagram showing a charging operation and a discharging operation with respect to voltages of the nodes VH and Vcc.

FIG. 10 is a diagram showing an operation of the power supply control device 100 according to the second embodiment.

As shown in FIG. 10, when the voltage of the node Vcc decreases and reaches the threshold value Vdet_L at time t21, the discharge circuit 140 is turned on exceptionally rather than intermittently. When the discharge circuit 140 is turned on, the follow-up property at the fall of the full-wave rectification is good in the voltage waveform of the node VH. In this state, when the voltage of the node VH becomes less than the threshold value Vth_ac at time t22, the start-up circuit 130 is turned on and the discharge circuit 140 is turned off.

After the voltage of the node VH reaches a peak at time t23, the discharge circuit 140 is intermittently turned on. At time t24 when the discharge circuit 140 is on, when the voltage of the node VH becomes less than the threshold value Vth_ac, the start-up circuit 130 is turned on, while the discharge circuit 140 interrupts intermittent turn-on and shifts to off.

When the voltage of the node VH reaches the peak again at time t25, the intermittent turn-on of the discharge circuit 140 is resumed. When the voltage of the node VH becomes less than the threshold value Vth_ac, the start-up circuit 130 is turned on, while the discharge circuit 140 interrupts intermittent turn-on and shifts to off. Such an operation is repeated until the voltage of the node Vcc reaches the threshold value Vdet_U at time t26.

With the power supply control device 100 according to the second embodiment, compared to the first embodiment, the power consumption can be further reduced as the amount of loss is reduced by intermittently turning on the discharge circuit 140.

In the second embodiment, the control circuit 110 may be configured to continue intermittent turn-on instead of turning off the discharge circuit 140 when turning on the start-up circuit 130. That is, in the second embodiment, the control circuit 110 may be configured to intermittently turn on the discharge circuit 140 a predetermined number of times after the voltage of the node VH reaches a peak.

Figure 11:
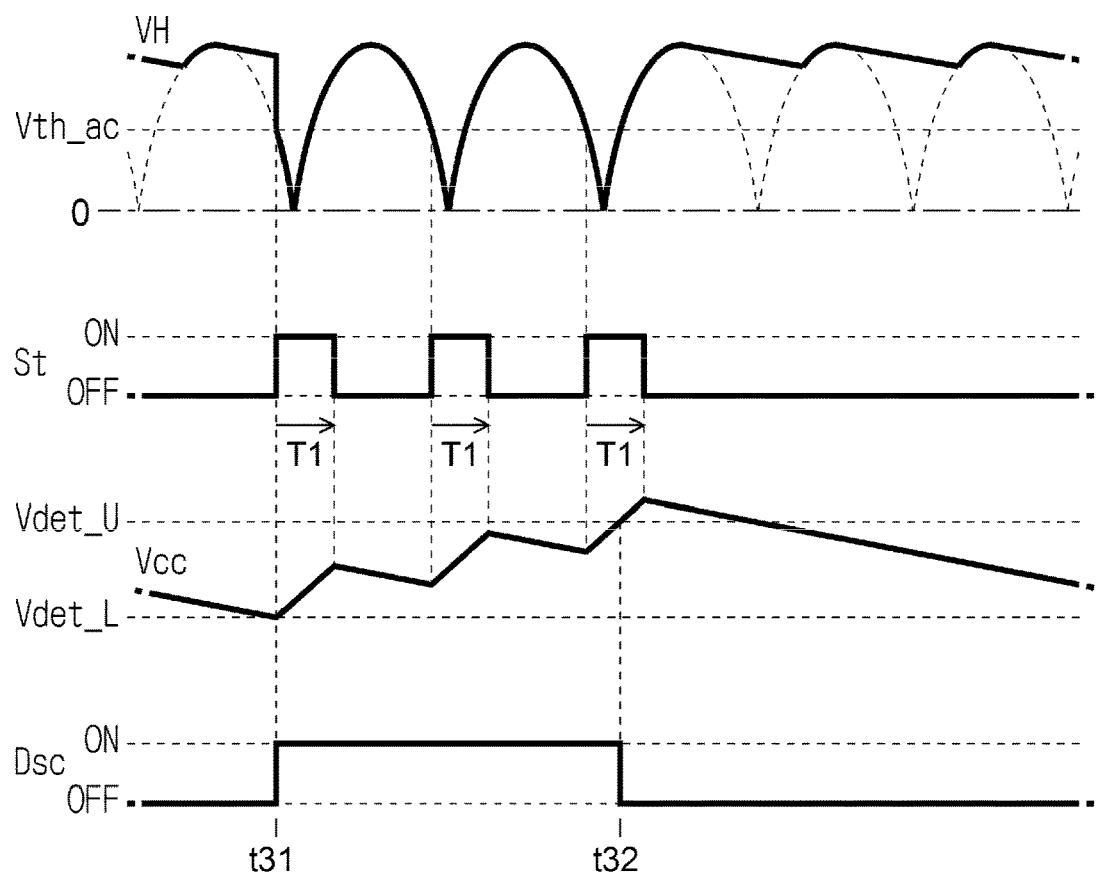
FIG. 11 is a diagram showing a charging operation and a discharging operation with respect to voltages of the nodes VH and Vcc.

In the first embodiment and the second embodiment, the start-up circuit 130 is turned on when the voltage of the node VH is less than the threshold value Vth_ac, and the start-up circuit 130 is turned off when the voltage is equal to or higher than the threshold value Vth_ac. However, the present disclosure is not limited to this configuration, and as shown in FIG. 11, the timing for turning off the start-up circuit 130 may be a timing when a predetermined period T1 has elapsed since the start-up circuit 130 was turned on. In such a configuration, the period from on to off may be changed in accordance with the load of the node Vcc. Specifically, the period from on to off may be set longer as the load on the node Vcc becomes heavier.

In the first embodiment and the second embodiment, the step-down circuit 120 is not always necessary. When the step-down circuit 120 is not provided, the node Vcc and the node N may be regarded as the same.

In addition, when the voltage of the node VH becomes less than the threshold value Vth_ac, the start-up circuit 130 is turned on every time, but the configuration may be such that the start-up circuit 130 is turned on once for a plurality of times when the voltage of the node VH is less than the threshold value Vth_ac.

When the voltage of the node VH is less than the threshold value Vth_ac and near zero, the transistor 134 does not turn on because the voltage between the source node and the gate node becomes insufficient. For this reason, strictly speaking, when the voltage of the node VH is near zero, the capacitor C12 is not charged, so the voltage of the node Vcc does not increase and becomes flat. However, in FIGS. 5, 8, 10, and 11, for simplification of explanation, it is expressed as the voltage of the node Vcc increases at a constant rate even if the value is near zero if the voltage of the node VH is less than the threshold value Vth_ac.

What is claimed is:

1. A power supply control device comprising:
    a charge circuit that charges a capacitor coupled to a second node with a full-wave rectified voltage input into a first node by being turned on;
    a first detection circuit that detects whether or not a voltage of the first node is less than a first voltage;
    a second detection circuit that detects whether or not a voltage of the second node is decreased to be less than a second voltage and whether or not the voltage of the second node is increased to be equal to or higher than a third voltage higher than the second voltage;
    a discharge circuit that discharges an electric charge accumulated in the first node by being turned on; and
    a control circuit that, in a period from when the second detection circuit detects that the voltage of the second node is decreased to be less than the second voltage until the second detection circuit detects that the voltage of the second node is increased to reach the third voltage, is configured to:
        when the first detection circuit detects that the voltage of the first node is less than the first voltage, turn on the charge circuit and turn on the discharge circuit over a portion or entirety of the period; and
        until the first detection circuit detects that the voltage of the first node is less than the first voltage, intermittently turn on the discharge circuit in a partial period of the period.

2. The power supply control device according to claim 1, wherein
    the control circuit turns off the charge circuit when the voltage of the first node is equal to or higher than the first voltage.

3. The power supply control device according to claim 1, wherein
    the control circuit turns off the charge circuit when a predetermined time or more elapses from when the charge circuit is turned on.

4. The power supply control device according to claim 1, wherein
    an end of the partial period is when the voltage of the first node becomes less than the first voltage.

5. The power supply control device according to claim 1, wherein
    a start of the partial period is after the voltage of the first node reaches a peak.

6. A switching power supply comprising:
    the power supply control device according to claim 1;
    a first rectifier circuit that rectifies an AC voltage;
    a second rectifier circuit that full-wave rectifies the AC voltage and supplies the AC voltage to the first node as the full-wave rectified voltage;
    a transformer that includes a primary winding, a secondary winding, and an auxiliary winding;
    a switching element that is provided in series with the primary winding between both output ends of the first rectifier circuit;
    a first output circuit that rectifies and smooths a voltage induced by the secondary winding and outputs the voltage; and
    a second output circuit that rectifies and smooths a voltage induced by the auxiliary winding and outputs the voltage to the second node, wherein
    the power supply control device controls switching of the switching element.

* * * * *